April 10, 1962

E. C. REYNOLDS

3,028,964

AUTOMATIC WATER SOFTENER SYSTEM INCLUDING A PRESSURIZED
BRINE TANK, CONTROL VALVE, VALVE OPERATING
MEANS, AND/OR TIMER COMBINATIONS

Filed Nov. 1, 1956

INVENTOR.
EARL C. REYNOLDS
BY
*William P. Serald*
ATTORNEY

April 10, 1962 E. C. REYNOLDS 3,028,964
AUTOMATIC WATER SOFTENER SYSTEM INCLUDING A PRESSURIZED
BRINE TANK, CONTROL VALVE, VALVE OPERATING
MEANS, AND/OR TIMER COMBINATIONS
Filed Nov. 1, 1956 7 Sheets-Sheet 4

FIG. 9

INVENTOR.
EARL C. REYNOLDS
BY
ATTORNEY

April 10, 1962

E. C. REYNOLDS 3,028,964

AUTOMATIC WATER SOFTENER SYSTEM INCLUDING A PRESSURIZED
BRINE TANK, CONTROL VALVE, VALVE OPERATING
MEANS, AND/OR TIMER COMBINATIONS

Filed Nov. 1, 1956

INVENTOR.
EARL C. REYNOLDS
BY
William P. Sevald
ATTORNEY

FIG. 11

April 10, 1962 E. C. REYNOLDS 3,028,964
AUTOMATIC WATER SOFTENER SYSTEM INCLUDING A PRESSURIZED
BRINE TANK, CONTROL VALVE, VALVE OPERATING
MEANS, AND/OR TIMER COMBINATIONS
Filed Nov. 1, 1956 7 Sheets-Sheet 7

FIG. 12

INVENTOR.
EARL C. REYNOLDS
BY
ATTORNEY

United States Patent Office 3,028,964
Patented Apr. 10, 1962

3,028,964
AUTOMATIC WATER SOFTENER SYSTEM INCLUDING A PRESSURIZED BRINE TANK, CONTROL VALVE, VALVE OPERATING MEANS, AND/OR TIMER COMBINATIONS
Earl C. Reynolds, 19130 Woodingham Drive, Detroit, Mich.
Filed Nov. 1, 1956, Ser. No. 619,817
10 Claims. (Cl. 210—140)

This invention generally relates to water softeners and particularly pertains to a water softener system including a fully charged pressurized brine tank and an automatically operated and timed system flow switch valve so that the system is capable of automatically backwashing, brining, rinsing, and returning to soft water use upon the tripping of the automatic sequence timer by a manual switch or by a period timer at the end of the desired period of soft water use.

Water softeners, brine tanks, and systems integrating same have been employed heretofore in conjunction with various types of valves and piping, however, the several devices of the prior art have not proved entirely satisfactory in operation and use.

With the foregoing in view, the primary object of the instant invention is to provide a fully automatic water softener, brine tank, and system flow rotary switch valve integration which is capable of operating for a period of soft water use and then to regenerate the system upon the tripping of an automatic sequence timer.

An object of the invention is to provide a fully charged pressurized brine tank which is capable of instant operation due to the fact that it is constantly capable of supplying brine for regenerating the water softener crystals.

An object of the invention is to provide a system flow switch valve which is capable of furnishing water at all times to the service connection by furnishing soft water to the service connection during the soft water use period and by furnishing hard water to the service connection during the backwash, brining, and rinsing cycles of softener tank regeneration.

An object of the invention is to provide a system which is capable of soft water use and regeneration cycle operation for long periods automatically such as for several months or a year wherein a service company can charge the brine tank with salt periodically thereby enabling the system to operate for the ensuing period so that an ordinary housewife can regenerate the system by merely operating a switch to trip the sequence timer or by having the sequence timer automatically tripped at intervals by a period timer.

An object of the invention is to provide a period timer for automatically actuating the sequence timer so that no manual operation of the device is required during service periods and so that the system will regenerate itself entirely automatically at pre-set intervals established by pre-determining the mineral or chemical content of the water of the locality and the amount of water used in the installation.

An object of the invention is to provide a sequence timer which is capable of energizing a motor and mechanical means for operating the valve for the purposes of putting the system through its regeneration cycle and back to soft water use.

An object of the invention is to provide a system flow switch valve which is capable of being easily moved through the various positions of regeneration and soft water use.

An object of the invention is to provide a system flow switch valve operating mechanism in conjunction with the sequence timer which is capable of moving the switch valve to certain locations at certain times to accomplish the desired switching and flow circulation of the water in the system.

An object of the invention is to provide means for moving the valve rotary selector core from the soft water use position, to the backwash position, to the regeneration brining and rinsing position, and back to the soft water use position and for holding the positions for a certain period of time and to provide means for adjusting the length of the periods as desired.

An object of the invention is to provide means easily adjustable to vary the length of time of the backwash period, the length of time of the brining period, the amount of brine used, length of time of the rinsing period, and the length of time of the soft water use period.

An object of the invention is to provide easily adjusted variable period timer and sequence timer devices and system so that period of soft water use and the period of regeneration including the incremental periods of the regeneration cycle, can be set as desired so that the devices and system can be custom installed to suit almost any conditions of volume of water, hardness, and iron.

An object of the invention is to provide a period timer and regeneration sequence timer system which can be adjusted for long or short periods of soft water use, long or short periods of regeneration, backwash, brining, and rinsing, and any combination of said periods depending on the individual characteristics of the water and rate of use.

An object of the invention is to provide an adjustable timer and system so that the system under any circumstances can be adjusted for optimum results coordinated so as to anticipate not only the ion exchange exhaustion point of the crystals, but also filter contamination due to foreign matter so that the system can be regenerated for the reason first occurring and the duration of backwash and brining periods coordinated in proportion to the exhaustion of the crystals and the contamination of the filter.

An object of the invention is to provide full automatic control so as to obviate human error or indifference so that the crystals will be regenerated prior to approaching a state of ion exhaustion and the filter cleaned prior to approaching a state of reduced efficiency contamination.

An object of the invention is to provide a water conditioning system which is flexible as to duration of soft water use, backwash, brining, and rinsing periods so that it can be easily adjusted and set to meet the specific demands of the installation so that regardless of the balance or unbalance between filter or filter bed contamination due to foreign matter such as iron deposits on the one hand and the softener crystal exhaustion due to ion exchange with "hardness" elements such as magnesium and/or calcium carbonates on the other hand.

An object of the invention is to provide an automatic fully adjustable system and elements particularly suitable for specific preventive maintenance so that the system can be automatically regenerated as often as desired, the length of the backwash period can be adjusted to the contamination state of the filter, the brining period can be adjusted to the exhaustion state of the crystals; and the rinsing period can be adjusted to the state of brine residuals thereby establishing the water conditioning system to combat the particular objectionable characteristics of the specific water in such manner to preventively maintain the system in optimum working condition.

An object of the invention is to provide valve actuating means which engage the valve core driven elements and first move the core axially relative to the housing to eliminate friction, then move the core angularly relative to the housing to the proper position, and then permit return axial movement to effect sealing.

An object of the invention is to provide mechanical means which release and by-pass the valve core driven elements after the valve core has arrived at and been seated in the proper position of the sequence.

An object of the invention is to provide an automatic water softener system which can be manufactured inexpensively as the component parts are easily made and the assembly of parts readily accomplished.

An object of the invention is to provide an automatic water softener which is foolproof in use and operation, which is simple in design and construction, easy to use, easy to maintain, and easy to repair by the replacement of easily replaceable parts.

These and other objects of the invention will become apparent by reference to the following description of an automatic water softener system embodying the invention taken in connection with accompanying drawings in which.

Figure 3:
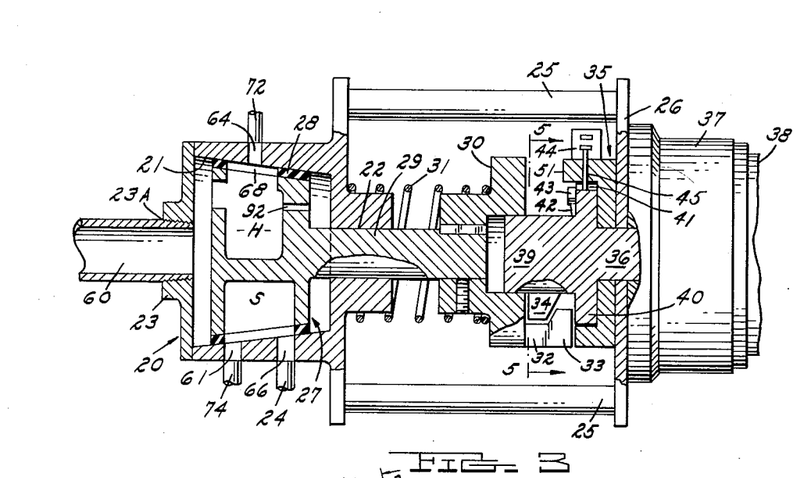
FIG. 3 is a longitudinal cross-sectional view of the switch valve and operating mechanism showing the valve porting diagrammatically.
Figure 4:
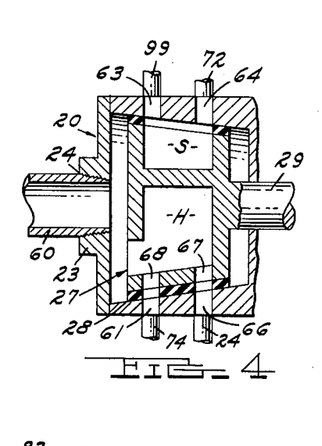
FIG. 4 is a longitudinal cross-sectional view of the valve seen in FIG. 3 diagrammatically showing a different relationship between core and housing.

Referring now to the drawings wherein like numerals refer to like and corresponding parts throughout the several views, the fully automatic pressurized tank system and the automatic system flow valve mechanism disclosed therein to illustrate the invention, comprises a valve housing 20 having a frusto-conical internal wall 21 defining the housing chamber, a bearing aperture 22 axially disposed relative to the wall 21, a cover plate 23 having an orifice, 23A, posts 25 supporting the plate 26, a frusto-conical rotary selection core 27 disposed in the housing 20 equipped with a neoprene surface 28 for sealably contacting the housing wall 21; the core 27 is fixed on one end of shaft 29 which is disposed in the housing bearing aperture 22 and boss 30 is fixed on the outer end of shaft 29; spring 31 is disposed between the boss 30 and the housing 20 so that the rotary core 27 on the other end of shaft 29 is springwise sealably urged into engagement with the housing wall 21 and the boss 30 carries the extension 32 which in turn carries the radially inwardly projecting driven lug 33 normally radially displaced relative to the drive dog 34. It can now be seen that axial force placed against the end of the driven lug 33 will move the driven lug 33, boss 30, shaft 29, and rotary core 27 to the left as seen in FIG. 3 to both unseat the core 27 relative to the housing wall 21 and also to move the driven lug 33 to the left so as to be radially aligned with the drive dog 34.

The stationary annular multi-faced and plural slotted cam 35 is fixedly mounted on the plate 26 and has a center aperture surrounding the drive shaft 36 which is powered at one end by the gear train 37 and motor 38 and at the other end has a head 39 piloted in the boss 30 so that the boss 30 can slide on the head 39 in boss 30 axial movement; drive head 39 carries drive dog 34 and collar 40 which has a cam notch 41 in its peripheral edge and drive head 39 also carries arcuate rise cam 42 on its radial side ending in step 43. The switch 44 is mounted on the stationary annular cam 35 and is actuated by the pin 45 which is slidably disposed in the stationary cam 35; the pin in turn is operated by the collar 40 and cam notch 41 as the collar rotates with the drive head 39.

The stationary annular multifaced and plural slotted face cam 35 is provided with slots 50, 52, and 54 dividing the cam faces 51, 53, and 55 and the driven lug 33 normally lies in one said slot to position the rotary selector core 27 relative to the housing 20. To change the position of the rotary selector core 27 relative to the valve housing 20, the valve drive motor 38 is energized by a sequence timer via a parallel circuit and the drive shaft 36, head 39, collar 40, cam 42, and step 43 start to turn so that the collar notch passes the pin 45 and the collar periphery moves the pin 45 to close the switch 44 in a main valve drive motor circuit whereby the motor 38 is then energized and the parallel circuit then broken as by a sequence timer. The collar arcuate face cam 42 moves angularly and contacts the end of the driven lug 33 and moves the lug 33 axially to the left out of the stationary cam slot 50, 52 or 54 and also moves the boss 30, shaft 29, and rotary core 27 to the left so as to unseat the core 27 for easy turning relative to the housing 20. The collar cam step 43 then contacts the driven lug 33 side and rotationally drives the lug 33 angularly over the stationary cam surfaces 51, 53, or 55 until the rise of the cam surface 51, 53, or 55 bears against the end of the driven lug 33 to move same axially to the left out of radial alignment with the rise cam step 43 and into the path of the drive dog 34 on the drive head 39, whereupon, by further angular motion of the drive head 39, the cam step 43 angularly by-passes and the drive dog 34 contacts the driven lug 33 and moves it angularly until the driven lug 33 reaches the next slot 50, 52, or 54 whereupon the spring 31 moves the driven lug 33 to the right as seen in FIG. 3 so as to axially by-pass the drive dog 34 and the cam step 43 and to move the driven lug 33 axially into a slot 50, 52, or 54. The motor 38 continues to drive the collar 40 until the peripheral notch 41 permits the pin 45 to move to open the switch 44 whereupon the valve drive motor 38 stops. Upon the next energization of the motor 38 by the sequence timer, the above described action will take place relative to the next stationary cam slot 50, 52, or 54 and stationary cam surface 51, 53, or 55 to place the valve rotary selector core 27 at the next position relative to the valve housing 20 to switch the system flow in the desired sequence.

Referring now to the water flow network, inlet pipe 60 is connected to housing cover 23 orifice 23A and introduces hard water into the housing interior against the face of the rotary selector core 27 and the core 27 covers the housing ports 61—66 so that fluid must pass the core 27 to flow from the hard water inlet orifice 23A to the housing ports 61—66. For this purpose the rotary selection core is equipped with an inlet distribution front chamber H communicating with the inlet orifice 23A and pipe 60 and the chamber H is in turn equipped with core ports 67 and 68 angularly spaced for selectively communicating with the housing ports; the back chamber S is equipped with one large spanning core port slot 60 for selectively communicating with the housing ports 61—66 as hereinafter move fully set forth.

The softener tank 70 has a top pipe 71 connected to housing port 64 via pipe 72 and a bottom pipe 73 connected to housing port 61 via pipe 74 so that flow of water 79 in the tank 70 can be from top to bottom or vice versa through a flat or tubular filter screen or through the optional tank perforate bottom 75 which supports the layers of gravel 76, sand 77, and water softening zeolite crystals 78. When a screen is used the sand, gravel and false bottom may be delted. The brine tank 80 is preferably equipped with a sand and gravel filter bed below the salt and has a top pipe 81 communicating with the housing port 65 via pipe 82, a bottom pipe 83 communicating via pipe 84 with pipe 72 and the softener tank top pipe 71 so that when water is fed to the brine tank top pipe 81 when valve 85 in pipe 84 is open, brine is fed to the softener tank 70 top via pipes 82 and 72; by-pass pipe 86 communicates with pipe 82 ahead of one-way check valve 98 and leads to pipe 84 through flow rate control valve 87 for proportioning and controlling brine flow and water volume and for feeding rinse water to the softener tank at a controlled rate as hereinafter more fully described.

The tanks 70 and 80 are provided with air-tight caps 90 and 91 respectively and after the tanks 70 and 80 are properly filled with the suitable materials, they are completely filled with water and the air is bled out of all the pipes and valves so that the whole system is under equalized fluid pressure as supplied by the hard water supply pipe 60 thereby the brine tank is subject to the full line pressure and also subject to the pressure fluctuations of line pressure thereat whereby it has been found the caking of salt is lessened. The rotary selector valve core 27 has a vacuum-break or pressure-release orifice 92 for equalizing fluid pressure on either side of the core 27 in its axial movement into and out of the valve housing. It can now be seen that when the core 27 is not in sealing contact with the housing wall 21, no flow occurs in the system in any direction because of the equalized pressure condition; however should the service pipe 24 draw water under this condition, the water flows directly from the inlet pipe 60 without disturbing the system equilibrium.

Referring now to automatic sequential timing and activation of the valve and system, FIGS. 1–9, the timer drum is driven via motor 100 and gear 101; the drum 102 is freely rotatably mounted on the axle 103 fixed to the plate 104 secured to the plate 26. The rotational speed of the timer motor 100 and gearing is so co-ordinated that the drum 102 makes a complete revolution in a definite period of time such as 90 minutes. The drum 102 is provided with serrations 105 for receiving the keys 106 which in turn carry tabs 110 for contacting the switch arms 107, 108, and 109 for opening and closing the contacts 107A, 108B, and 109C of switches A, B, and C, and it is to be noted that contacts 107A and 109C are normally open while contact 108B is normally closed. Switch arm 108, normally closed contacts 108B, key 106B, and tab 110B operate the sequence timer motor 100 main circuit including wires 220 and 223 on one side and wires 205, 204, and 200 on the other side of switch B; manual switch 111 is in a timer motor 100 parallel circuit including wires 200, 204, 205, and 206 on one side and wires 222 and 206 on the other side of switch 111 to initiate timer clock motor 100 rotation. The timer clock motor 100 stops when drum 102 rotates key 106B to bring tab 110B into contact with arm 108 so as to move it outwardly to open the contacts 108B. The pilot light 112 is energized when the switch B is closed via wires 200, 209, 208, and 206 on one side and wires 220 and 223 on the other side of switch B so that upon the pilot light lighting and maintaining itself the operator releases the manual switch 111 and the automatic cycle of the drum then proceeds on the main circuit until the key tab 110B again opens the contacts 108B whereupon the timer motor stops and the timer drum cycle is completed.

The drum 102 carries keys 106A having tabs 110A for contacting switch arm 107 to close contacts 107A which are in the valve drive motor 38 parallel circuit via wires 200 and 223 on one side and wires 200, 201, 202, and 203 on the other side of the switch A and this circuit is used long enough to start the valve drive motor to move the collar notch 41 away from pin 45 so as to close the hold switch 44 in the drive motor main circuit of wires 200 and 221 on one side and wires 200, 201, and 202 on the other side of switch 44. In actuating the valve drive motor 38, the key tab 110A closes contacts 107A in the parallel circuit long enough to rotate the collar 40 to close the switch 44 in the main circuit whereafter switch A is permitted to open the parallel circuit and when the collar 40 has made one complete revolution the pin 45 drops into the collar cam notch 41 allowing switch 44 to open the main circuit to stop the valve drive motor 38 at the same point each time with mechanical accuracy. Several keys 106A are carried by the drum 102 at various points to actuate the valve drive motor 38 at different times during the system complete cycle as hereinafter explained.

Figure 1:
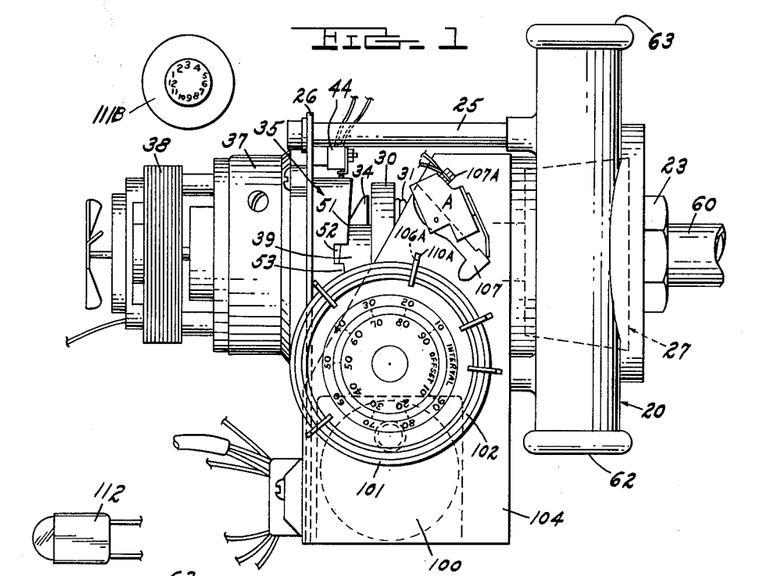
FIG. 1 is a top plan view of the system switch valve and operating mechanism together with automatic sequence and period timers.
Figure 2:
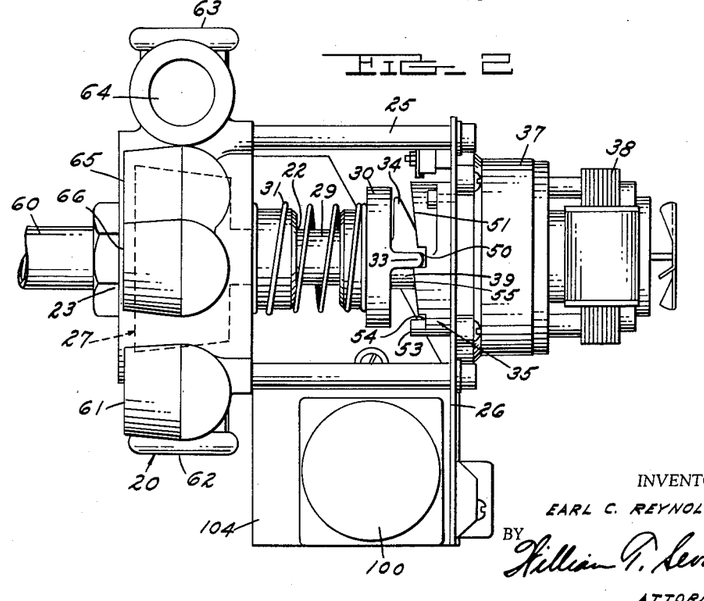
FIG. 2 is a bottom plan view of the device seen in FIG. 1 showing the valve operating mechanism more plainly.
Figures 7, 8:
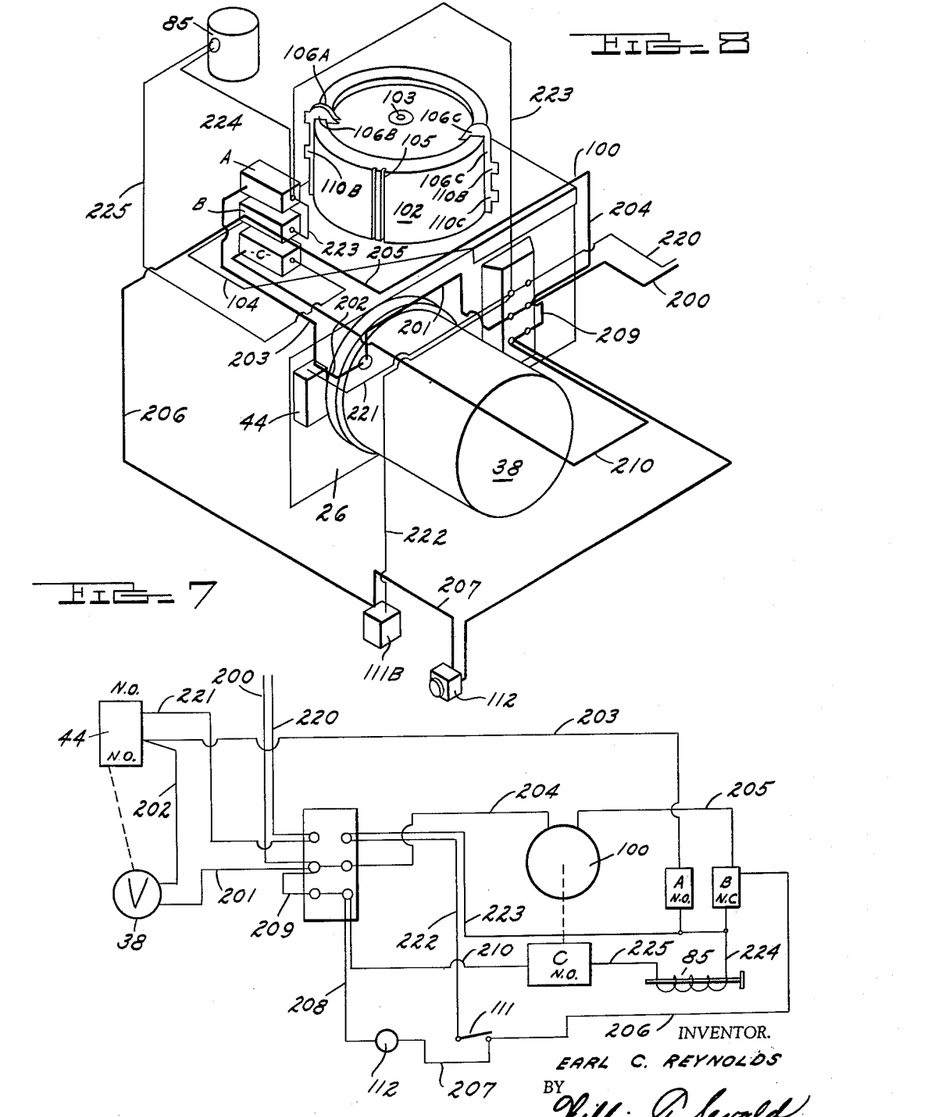
FIG. 7 is a plan wiring diagram of the electrical elements showing mechanical drives in dotted lines.
FIG. 8 is a schematic perspective diagram showing the wiring, electrical motors, switches, and mechanical drives.

The drum 102 carries keys 106C having tabs 110C for contacting switch arm 109 to close contacts 109C of switch C which are in the solenoid valve 85 circuit via wires 220, 223, 224, and 225 on one side and wires 210, 209 and 200 on the other side of switch C. The normally closed solenoid valve 85 is opened by the closing of the contacts 109C as held by the tab 110C and as many keys 106C as desired are closely positioned on the drum 102 to hold the contacts 109C closed for the period of time that it is desired to have the solenoid valve 85 open. FIGS. 1 and 8 show a period timer 111B instead of the manual switch 111 and it is to be understood that any suitable period timer can be used to provide power for a short time to energize the timer motor 100 to permit the switch B to close. The period timer is adapted to be set to supply power to the timer motor 100 for a sufficient period every day or number of days or every week or number of weeks as desired and comprises a mechanism adapted to close contacts at the end of the pre-set period for the short duration necessary to start the automatically continued and terminated cycle of the sequence timer motor 100.

*Soft Water Use Operation*

During soft water use the sequence timer's condition is such that key tab 110B is holding against switch B arm 108 to keep the contacts 108B open and pin 45 is in collar notch 41 leaving switch 44 open so that the timer motor 100 is not energized and the valve operating mechanism is static with the driven lug 33 lying in the soft water use slot 50 of the stationary cam 35 with the rotary selector core 27 sealably engaging the housing 20 wall 21 with the hard water supply pipe discharging into core chamber H with core port 68 communicating with housing port 64, pipe 72 and softener tank top pipe 71 to introduce hard water 79 to the top thereof, which water then passes through the crystals 78, sand 77, gravel 76 and perforate false bottom 75 or a screen filter (not shown) and then as softened water travels via the softener tank bottom pipe 73, pipe 74, housing port 61, rotary core chamber S, housing port 66 and service pipe 24 to use. Core port 67 is blocked by the housing 20, and housing ports 62, 63 and 65 are blocked by the core 27 so that flow does not occur in the rest of the system. This condition will continue until the manual switch 111 or period timer 111B supplies current to the timer motor 100 to drive the drum 102 to permit switch B to close.

*Backwash Operation*

When the softener crystals or filter of the tank 70 become partially saturated it is necessary to regenerate the crystals and to backwash the filter or filter bed to remove filtered sediment and deposits and it is therefore first necessary to reverse the flow in the tank 70. The interval of softener tank regeneration is predetermined and the interval is set on the automatic period timer 111B, or if a period timer is not used, the user closes the manual switch 111 for a short time whereupon the timer clock motor 100 is energized via parallel circuit wires 200, 204, 205 and 206 on one side and wires 220 and 222 on the other side of switch 111 so that the drum 102 starts to rotate until key tab 110B releases switch B arm 103 to permit the contacts 108B to close whereupon the motor 100 main circuit is closed with wires 200, 204 and 205 on one side and wires 220 and 223 on the other side of the switch B and when the switch B is closed the pilot light 112 is energized via wires 200, 209, 208, 207 and 206 on one side and wires 220 and 223 on the other side of the switch B. When the pilot light maintains itself the user then releases the manual switch 111 and the timer operation and drum 102 rotation continues automatically until the switch B is again opened by the key tab 110B. The pilot light also advises the user that the system is being regenerated and soft water is not available for use.

Upon the drum 102 rotating slowly to make a complete revolution in 90 minutes, key tab 110A next comes into contact with the arm 107 of the switch A to close the contacts 107A whereupon the valve drive motor 38 is energized via parallel circuit wires 200, 201, 202, 203 on one side and wires 220 and 223 on the other side of the switch A. The valve drive motor through gear train 37 slowly rotates drive shaft 36 so that collar 40 thereon rotates to move collar notch 41 away from and collar 40 into contact with pin 45 so as to move the pin 41 outwardly to close switch 44 whereupon valve drive motor 38 main circuit is closed via wires 200, 201, and 202 on one side and wires 220 and 221 on the other side of the switch 44 and with further drum 102 rotation parallel circuit switch A is then permitted to open the parallel circuit so that valve drive motor will continue to operate on the main circuit to move the valve drive shaft 36 one complete revolution until the pin 45 again falls into the notch 41 permitting switch 44 to open in the main circuit to stop drum 102 rotation.

Figure 5:
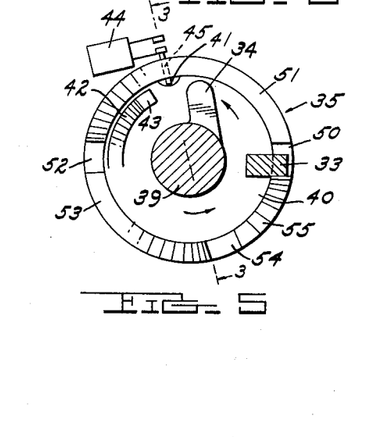
FIG. 5 is a cross-sectional view of FIG. 3 taken on the line 5—5 thereof showing the mechanical driving elements of the valve operating means.

During one revolution of the drive shaft 36, the switch 44 is first closed and then upon further rotation from the position seen in FIG. 5, the arcuate cam 42 on the side of the collar 40 engages the end of the driven lug 33 and moves the lug 33, boss 30, valve shaft 39, and valve core 27 to the left to unseat the valve core 27 relative to the housing 20 and the rise on the arcuate cam 42 is sufficient to move the driven lug 33 out of the stationary cam 35 notch 50 above the low end of stationary cam surface 51, whereupon with further turning of the shaft 36 the step 43 on the collar 40 contacts the side of the driven lug 33 and angularly moves same over the stationary cam surface 51 until the rise in the surface 51 moves the driven lug 33 axially outwardly or to the left as seen in FIG. 3 so that step 43 angularly by-passes the driven lug 33. The axial outward movement of the driven lug 33 and associated parts, first effected by the moving arcuate cam 42 and subsequently effected by the stationary cam surface 51, is such to move the driven lug 33 from the position seen in FIG. 3 to a position of radial alignment and overlap with the drive dog 34 so that when the step 43 by-passes the driven lug 33 in the direction of the arrows of FIG. 5, the drive dog 34 upon further rotating the shaft 36 then engages the side of the driven lug 33 and moves the driven lug 33 angularly with lug 33 end abutting the stationary cam surface 51 until the pin 45 falls into the notch 41 and the valve drive motor stops with lug still not located in a cam slot 50, 52, 54 because the start and stop position of the drive head is in the area of the stationary cam surface 51; the timer drum 102 next brings another key tab 110A against arm 107 which closes contacts 107A until the collar rotates to again move the pin 45 outwardly to close the switch 44 whereupon the drive dog 34 moves the driven lug 33 angularly until the driven lug 33 falls into stationary cam notch 52; the drive parts continue to rotate until pin 45 falls into notch 41 permitting switch 44 to open.

It is to be understood that the starting and ending position of the driving head 39 and associated collar 40, arcuate cam 42, step 43, and drive dog 34 is seen in FIG. 5 and that one revolution carries the head 39 and associated parts in the direction of the arrows so that in moving the driven lug from slot 50 to slot 52 the drive dog 34 moves the driven lug 33 from the position seen in FIG. 5 to a point adjacent the switch 44 whereat the pin 45 permits switch 44 to open. Since the driven lug 33 is not in the next slot 52, it is necessary to again cause the head 39 and associate parts to make one more revolution whereupon the driven lug 33 will be moved by the drive dog 34 to the next cam slot 52 whereupon the spring 31 axially moves the driven lug 33 into the stationary cam slot 52 out of radial alignment with the drive dog 34 so that the drive dog 34 angularly by-passes the driven lug 33 and again comes to rest as seen in FIG. 5; it is to be noted that the drive dog 34 is shown approximately 180 degrees out of phase in FIG. 4 for clear understanding of its working relationship with the driven lug 33; FIG. 5 shows the correct fixed position of the drive dog 34 relative to arcuate cam 42 and step 43 on the head 39.

Figure 10:
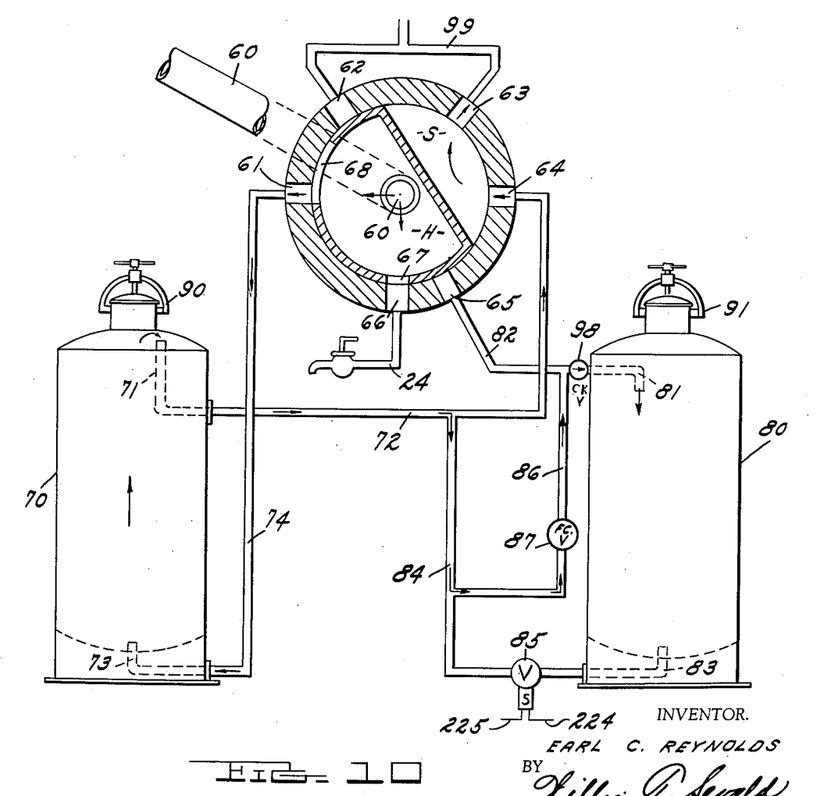
FIG. 10 is a view similar to FIG. 9 showing the system in the condition of backwashing the softener tank.

The driven lug 33 now has been moved 180 degrees from soft water use slot 50 to backwash slot 52 and in its angular movement has rotated the boss 30, valve shaft 29, and rotary selector core 180 degrees relative to the housing 20 so that housing ports 62 and 65 are blocked, FIG. 10, and hard water via the pipe 60 enters core chamber H and is fed via core port 67, housing port 66, and pipe 24 directly to service and hard water is also fed via core port 68, housing port 61, and pipe 74 to softener tank bottom pipe 73 where it feeds upwardly through the tank 70 to the top pipe 71, pipe 72, housing port 64, core chamber S, housing port 63, and drain pipe 99 to waste and the upward flow of the water 79 in the softener tank 70 backwashes the filter screen and/or the gravel 76, sand 77, and crystals 78, to remove deposits and sediment therefrom and this condition will prevail as long as driven lug 33 is in backwash slot 52, and the desired time interval is set on the drum 102 by selectively spacing keys 106A.

The next key 106A on the drum 102 is positioned away from the first key 106A by the time desired for backwashing such as, for example, twenty five minutes.

*Regeneration Brining and Rinsing*

After the backwashing has been finished, the drum 102 moves the next key 106A into contact with switch A arm 107 to close contacts 107A whereupon the valve drive motor 38 again is energized to rotate the driving head 39 clockwise from the position seen in FIG. 5 whereupon the arcuate moving cam 43 moves the driven lug 33 axially out of backwash slot 52 and then step 43 and drive dog 34 angularly move the driven lug 33 along the stationary cam surface 53 until the driven lug 33 falls into stationary cam slot 54 whereupon the drive dog 34 by-passes the driven lug 33 and the driving head 39 and associated parts complete one revolution and come to rest as seen in FIG. 5.

Figure 11:
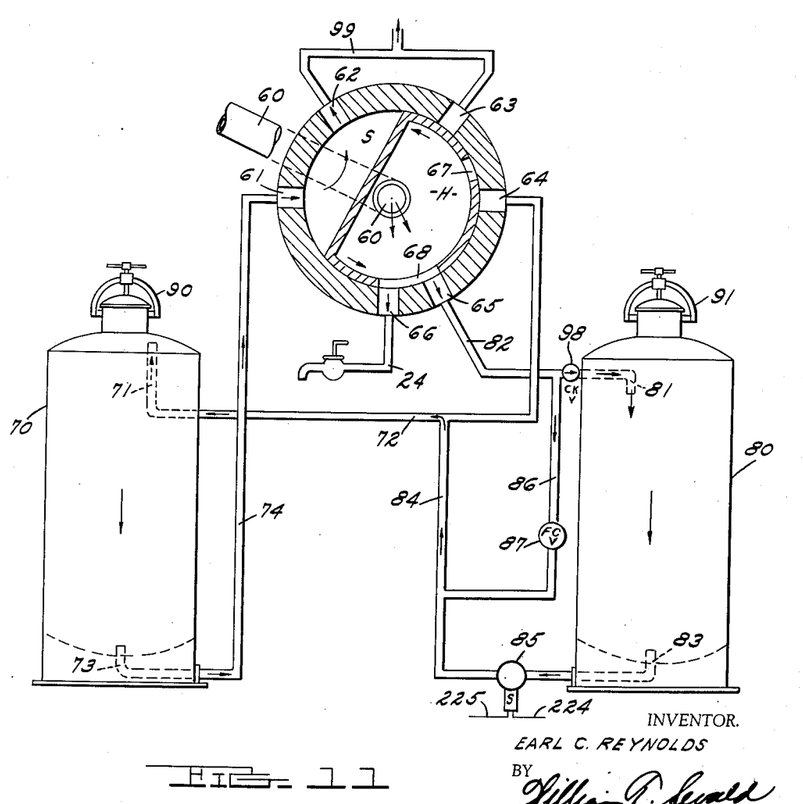
FIG. 11 is a view similar to FIG. 9 showing the system in the condition of regeneration brining.

The driven lug 33 in its angular movement between backwash slot 52 and brining and rinsing slot 54 has moved the boss 30, valve shaft 29 and rotary selector core 27 to the position of FIG. 11 relative to the housing 20 so that hard water enters core chamber H and is fed to service via core port 68, housing port 66, and pipe 24; core port 68 also supplies hard water to the pipe 82 via housing port 65 and it is to be noted that core port 67 and housing ports 63 and 64 are blocked off. Upon this condition existing a close-pack series of keys 106C on the drum 102 having tabs 110C are brought into contact with switch C arm 109 and contacts 109C are closed for the desired time, such as for 15 minutes, so that the solenoid valve 85 is opened via the wires 200, 209, and 210 on one side and the wires 225, 224, 223 and 200 on the other side of the switch C.

Upon the solenoid valve 85 being open, water from the pipe 82 passes one-way check valve 98 and enters the brine tank top pipe 81 and flows downwardly through the salt therein and brine emits from the brine tank bottom pipe 83 and travels through solenoid valve 85 and pipes 84, 72 and 71 to the top of the softener tank 70 and downwardly through the softener tank 70 and emits through pipes 73, 74, housing port 61, core chamber S, housing port 62, and drain pipe 99 to waste. During the brine flow period hard water also passes through flow control valve 87 through pipe 86 which is connected between pipe 82 and pipe 84 so as to bypass brine tank 80 to mix hard water with the brine in pipe 84 and due to the fact that flow control valve 87 adjustably regulates the volume of water therethrough, the proportion of brine and hard water is regulated thereby as desired to regenerate the softener crystals 78.

Figure 12:
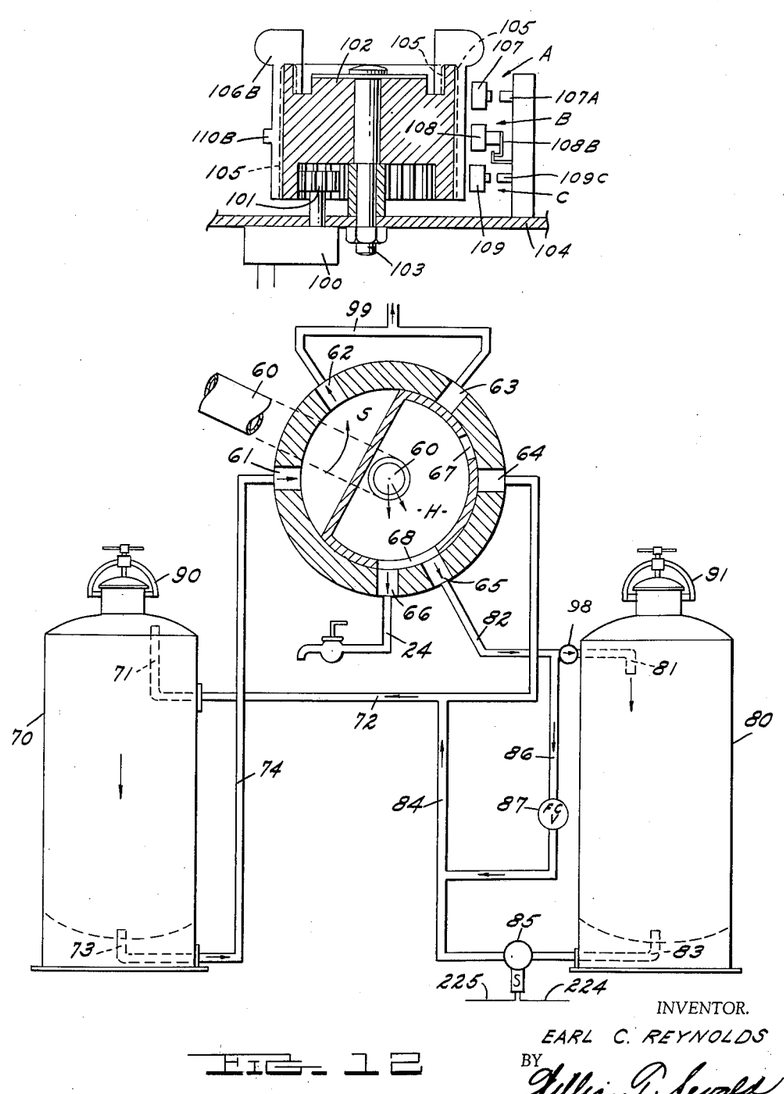
FIG. 12 is a view similar to FIG. 9 showing the device in the condition of regeneration rinsing.

After the brining period terminates and the crystals 78 are regenerated, switch C arm 109 is passed by the tabs 110C so as to permit contacts 109C to open whereupon solenoid valve 85 closes and all water from the pipe 82 is fed via by-pass pipe 86 and flow rate control valve 87 to the top of the softener tank 70, FIG. 12, to rinse the brine residue from the softener tank 70 and this rinse period continues for the desired time, for example such as 30 minutes, during which time the drum 102 continues to rotate.

Figure 6:
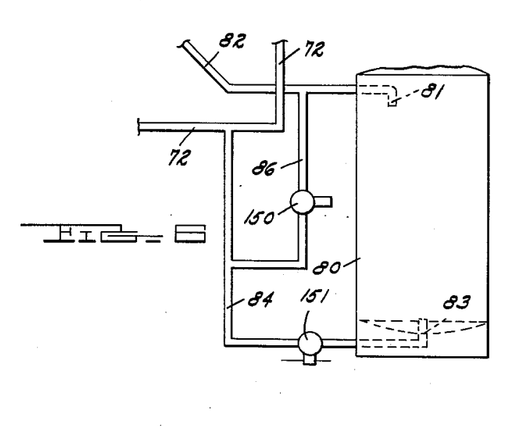
FIG. 6 is a plan view of a modified valving arrangement for the brine tank.

A modified brine tank valving arrangement is shown in FIG. 6 wherein normally closed solenoid valve 150 is disposed in pipe 86 and normally closed solenoid valve 151 is disposed in pipe 84. In brining, FIGS. 6 and 11, the valve 151 is opened so that water flow is directed through the brine tank 80 via pipes 82 and 81 and is delivered to the softener tank 70 via pipe 83, valve 151, pipes 84, 72 and 71. In rinsing, valve 151 is closed and valve 150 is opened and rinse water is fed to the softener tank 70 via pipes 82 and 86, valve 150, and pipes 84, 72 and 71. Due to the fact that valve 150 is closed when valve 151 is open, all water is directed through the brine tank 80 whereas when valve 151 is closed and valve 150 is open, water flow through the brine tank 80 is blocked and all water is circuited around the brine tank and directed to the softener tank 70 for rinsing. The valves 150 and 151 are operated by suitable keys 106 and tabs 110 on the timer drum 102 and at the desired time and for the desired duration as will be understood from the description incident to valve 85 in the preferred embodiment of the invention relative to brining and rinsing.

Return to Soft Water Use

Figure 9:
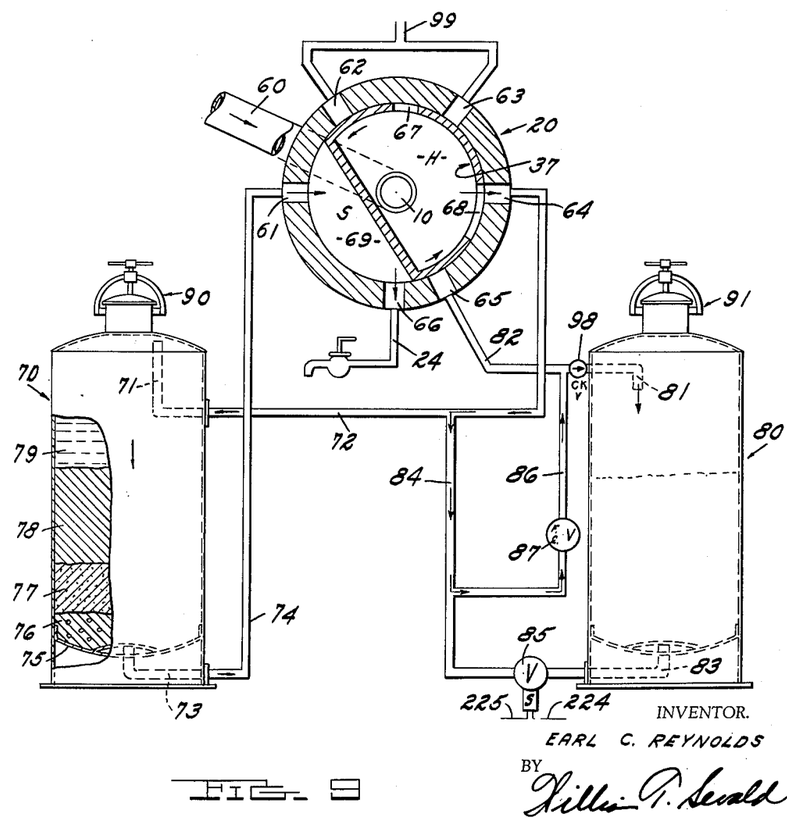
FIG. 9 is a schematic plan view of the softener tank, brine tank, switch valve, piping, and valves with the system in the condition of soft water use showing the system flow switch valve and the timer in cross section.

At the end of the rinsing period the drum 102 brings another key tab 110A into contact with switch A arm 107 whereupon the contacts 107A are closed and the valve drive motor 38 is energized to rotate the driving head 39 from the position seen in FIG. 5 so that the arcuate cam 42 contacts the end of the driven lug 33 lying in slot 54 and moves it axially thereout whereupon step 43 and drive dog 34 angularly move the driven lug 33 to the soft water use slot 50 where spring 31 drives the driven lug 33 thereinto out of radial alignment with drive dog 34 whereupon drive dog 34 by-passes driven lug 33 and the driving head 39 and associated parts again come to rest in the position of FIG. 5 putting the system in condition of soft water use as previously described and as seen in FIG. 9.

Timer Cycling

The timer drum 102 is completely surrounded by the serrations 105 for receiving keys 106 therein so that keys 106 having tabs 110 can be placed thereon at any desired point to vary the time duration of the backwash, brining, and rinsing periods in the cycle as is well understood in the timer art. While the drum 102 and sequence timer shown and described has a cycle of 90 minutes, this cycle can be of any time duration such as 60 minutes, 3 hours, etc. as desired. Regardless of the time duration cycle of the timer drum 102, the keys 106 can be placed and spaced thereon to provide backwash, brining, and rinsing periods of any desired time depending on the water softener system, the amount of the water used per day, and the chemical and iron content or hardness of the water so that the softener tank can be regenerated every day or several times a day in installations of high iron and/or extremely hard water and/or excessive water use, or can be regenerated after any number of days or weeks in installation of slightly hard water and/or low use. However, it has been found preferable to regenerate the softener often to maintain filter and crystal optimum efficiency and the time to regenerate can be easily calculated and due to the fact that only the flip of a switch or the setting of a period timer is required, no user inconvenience or hardship is involved and the inability or indifference of the user is eliminated.

After the system has been installed on location, it is necessary to set the period timer and the stages of the sequence timer. The length of time set on the sequence timer for the backwash stage is coordinated to the iron or solid matter content of the water to be conditioned which is handled by the filter or filter bed of the softener tank. A previous water analysis gives this information and the backwash stage length of time is then determined in view of the kind of filter or filter bed used and the percentage content of iron or other filterable matter in the water.

The previous water analysis also advises the percentage content of ion exchange material in the water such as magnesium or calcium carbonates and the brining and rinsing stage period of time is determined and set on the sequence timer in view of the size and type of the ion exchange crystal bed of the softener tank and the amount of ion exchange material in the water.

The filter capacity and crystal capacity are then studied relative to the iron and carbonate content respectively of the water, and it is determined whether the filter or the crystals will first require regeneration and what the elapsed period of time will be in conjunction with rate of water use. This period of time is then set on the period timer and the system is ready for use and the regeneration will be effected at the correct time.

Relatively short periods of soft water use have been found preferable on the basis of preventive maintenance incident to the filter and the crystals. In other words it has been found preferable to backwash the filter before substantial contamination occurs or before too much time elapses thereby preventing embedding of the iron or other matter; also it has been found preferable to regenerate the crystals before the ion exchange is too far depleted. This maintains both the filter and the crystal in optimum working condition and it has been found that they both not only operate better with frequent regeneration but also that they last longer and maintain high efficiency over much longer life periods.

In other words, due to the fact that the inconvenience, indifference or inability of the user to regenerate the system as often as desired has been eliminated, the system can be set for relatively shorter periods of soft water use and to be regenerated more often thereby preserving the filter and the crystals in a state of highest efficiency.

While the setting of the period timer and the sequence timer has been described in conjunction with on-the-job conditions, it has been found highly satisfactory to provide the factory with water analysis and rate of use information so that the period timer and the sequence timer can be fully integrated and set at the factory prior to the workmen mounting same in the installation.

The inventive switch valve, valve operating means, and pressurized system in combination with the automatic sequence timer and period timer constitutes a compact, durable, foolproof, and neat appearing automatic soft water system adaptable to all commercial and domestic installation conditions.

Although but a single embodiment of the invention has been shown and described in detail with one brine tank valving modification, it is obvious that many changes may be made in the size, shape, detail, and arrangement of the various elements and combinations of the invention within the scope of the appended claims.

I claim:

1. An automatic water softener system comprising a softener tank having a top and bottom, a brine tank having a top and bottom, a system flow switch valve, a pipe network interconnecting said valve between raw water supply, service, and the tops and bottoms of said tanks; said system flow switch valve having a housing equipped with ports communicating with said pipe network and a rotary selector core having chambers and ports communicating selectively with said housing ports; said valve core being rotatable relative to said housing for changing the relationship of said core chambers and ports relative to said housing ports to switch the system flow through said valve, pipe network and tanks to establish conditions of soft water use, backwash, and brining-rinsing; said valve core having an attached driven shaft with an outer end penetrating said housing, a boss on the end of said shaft, and a spring disposed between said housing and said boss displaceably urging said shaft axially outwardly to axially position said core and said boss relative to said housing; a stationary multi-slotted and plural faced annular cam disposed relative to said boss, and a driven lug on said boss adapted to displaceably lie in the slots of said stationary cam under said spring pressure to position said core via said boss and shaft relative to said housing in its several soft water use, backwash, and brining-rinsing flow control conditions.

2. In a device as set forth in claim 1, a drive shaft, a drive head on said drive shaft, a driving cam on said head adapted to contact the end of said driven lug to move said lug axially out of said stationary cam slots against said spring to free said driven lug for angular movement, and a step on said driving cam adapted to contact and angularly move said driven lug to rotate said core relative to said housing; said stationary cam surfaces being adapted to contact the end of said driven lug in its angular movement and to displace said driven lug further axially to move said driven lug out of radial alignment with said driving cam step; and a drive dog on said driving head behind said step adapted to contact said driven lug in its displaced axial position to move said driven lug along said stationary cam surface to said stationary cam next slot; said spring being adapted to axially move said driven lug via said boss into the next said stationary cam slot to locate said core in its next sequential position and to move said driven lug out of radial alignment with said drive dog to disconnect the drive between said driving and driven parts.

3. In a device as set forth in claim 2, a valve drive motor and gear train adapted to power said drive shaft, a collar on said drive head having a cam notch therein, a pin adapted to ride said collar and cam notch, a valve drive motor main circuit, and a normally open switch disposed in said main circuit adapted to be closed by said pin riding said collar and to be permitted to open by said pin riding said cam notch; said pin and cam notch being adapted to locate said driving ports each time at the same angular position by permitting said switch to open; said pin and collar being adapted to hold said switch closed to cause said motor to power said driving parts through one complete revolution.

4. In a device as set forth in claim 3, an automatic sequence timer, a parallel circuit for said valve drive motor, a switch in said parallel circuit operated by said timer; said timer being adapted to close said switch in said valve drive motor parallel circuit at certain desired times long enough to energize said valve drive motor a sufficient time to rotate said drive shaft, head, and collar notch away from said pin to cause said pin to ride said collar to close said switch in said valve drive motor main circuit whereupon said main circuit and switch energizes said valve drive motor until said collar cam notch again receives said pin permitting said main circuit switch to open.

5. In a device as set forth in claim 4, a solenoid operated normally closed valve controlling entry of water to said brine tank top, a solenoid valve circuit, a normally open switch on said timer in said solenoid valve circuit adapted to be closed by said timer at a certain time for a desired period to open said solenoid valve to supply water to said brine tank top to force brine from said brine tank bottom; the opening of said solenoid valve being coordinated with the brining position of said rotary selector core to said housing.

6. In a device as set forth in claim 4 a main circuit for energizing said sequence timer, a normally closed switch in said sequence timer main circuit for energizing said sequence timer, means on said timer adapted to open said switch at the end of said sequence timer cycle, a parallel circuit for temporarily energizing said sequence timer, and a switch in said timer parallel circuit adapted to energize said sequence timer for a sufficient period to actuate said sequence timer past said sequence timer main circuit switch opening means to permit said sequence timer main circuit to close; said sequence timer then is energized by said sequence timer main circuit until said means again opens said sequence timer main circuit switch at the end of the sequence timer cycle.

7. In a device as set forth in claim 6 a period timer adapted to close said sequence timer parallel circuit switch at desired intervals for a sufficient time to energize said sequence timer motor long enough to permit said sequence timer main circuit switch to close.

8. A water softening system comprising a water softener tank having crystals for softening hard water as the hard water flows over the crystals; said tank having opposite ends; a supply pipe conducting hard water under live supply pressure to one end of said tank; a service pipe leading from the other end of said tank to service use so that upon soft water service use water flows through said softener tank and becomes softened by traveling over said crystals; said crystals losing their softening power through use and being regenerated by flowing salt brine over said crystals periodically; a brine tank having salt granules for making salt brine therein in conjunction with water therein; said tank having opposite ends; an outlet pipe leading from one end of said brine tank to one end of said softener tank for delivering brine to said softener tank occasionally to regenerate said crystals periodically; an inlet pipe continually conducting hard water under supply live pressure to the other end of said brine tank for supplying said brine tank with water to make brine in conjunction with said salt granules, to force brine occasionally through said salt granules out of said brine tank via said outlet pipe to said softener tank, and to maintain said salt granules and brine under continual pressure from said water inlet pipe leading to said brine tank; and a normally closed valve in said outlet pipe leading from said brine tank to said softener tank for selectively opening said outlet pipe to permit brine from said brine tank to flow into said softener tank and over the crystals therein to regenerate them and for normally closing said outlet pipe when brine flow is not desired to prevent brine flowing in response to the continual live supply pressure exerted at said brine tank by the inlet pipe; said inlet pipe to said brine tank continually supplying water under live supply pressure and thereby continually subjected to the pressure fluctuations of line pressure at said brine tank even when said brine outlet pipe is closed by said valve to maintain the salt granules and brine in the tank under pressure to prevent said salt granules melting into one another and forming a salt block which would prevent brine flow through said brine tank when brine flow is needed; said salt granules holding their granular form collectively making a porous mass when under pressure in the brine within the brine tank eliminating a blocking obstruction in the tank and thereby maintaining the brine tank interior in an unobstructed condition for delivering brine flow when brine is needed to regenerate the softener crystals.

9. In a system as set forth in claim 8, a check valve in said brine tank inlet pipe permitting supply pressure flow into said brine tank and preventing brine reverse outflow therefrom as a result of a drop in supply pressure occurring to eliminate contamination of the water supply system with salt brine.

10. In a system as set forth in claim 8, a pipe connecting hard water supply to said brine tank outlet pipe for diluting the brine flowing from said brine tank prior to contact with the crystals in said softener tank and a flow control valve in said pipe connecting hard water supply to said brine tank outlet pipe allowing partial flow therethrough and back pressuring hard water through said brine tank to force brine out of said brine tank.

References Cited in the file of this patent

UNITED STATES PATENTS

| | | |
|---|---|---|
| 1,661,675 | Norquist | Mar. 6, 1928 |
| 1,704,982 | Lindsay | Mar. 12, 1929 |
| 1,740,540 | Eisenhauer | Dec. 24, 1929 |
| 1,910,011 | Griswold et al. | May 23, 1933 |
| 1,928,384 | McCanna | Sept. 26, 1933 |
| 1,937,324 | Pick | Nov. 28, 1933 |
| 1,943,865 | Hennessey | Jan. 16, 1934 |
| 1,974,335 | Kimball | Sept. 18, 1934 |
| 2,327,959 | Cerow | Aug. 24, 1943 |
| 2,630,325 | Reynolds | Mar. 3, 1953 |
| 2,631,665 | Perrin | Mar. 17, 1953 |
| 2,636,560 | Rogers | Apr. 28, 1953 |
| 2,670,328 | Webb | Feb. 23, 1954 |
| 2,738,807 | Addison | Mar. 20, 1956 |